(12) United States Patent
Word

(10) Patent No.: US 9,898,772 B1
(45) Date of Patent: Feb. 20, 2018

(54) ITEM RECOMMENDATION

(71) Applicant: Amazon Technologies, Inc., Reno, NV (US)

(72) Inventor: Jonathan Brian Word, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1009 days.

(21) Appl. No.: 14/061,683

(22) Filed: Oct. 23, 2013

(51) Int. Cl.
*G06Q 30/00* (2012.01)
*G06Q 30/06* (2012.01)

(52) U.S. Cl.
CPC .................. *G06Q 30/0631* (2013.01)

(58) Field of Classification Search
CPC ................................. G06Q 30/0631
USPC ........................................ 705/26.7
See application file for complete search history.

(56) References Cited

U.S. PATENT DOCUMENTS

| | | | | |
|---|---|---|---|---|
| 5,974,396 | A * | 10/1999 | Anderson | G06Q 30/02 705/14.25 |
| 6,801,909 | B2 * | 10/2004 | Delgado | G06F 17/30864 |
| 8,019,643 | B2 | 9/2011 | Lore et al. | |
| 8,214,264 | B2 * | 7/2012 | Kasavin | G06F 17/30867 705/14.4 |
| 2002/0107853 | A1 * | 8/2002 | Hofmann | G06F 17/30699 |
| 2002/0198882 | A1 * | 12/2002 | Linden | G06F 17/30867 |
| 2003/0083961 | A1 * | 5/2003 | Bezos | G06Q 30/02 705/26.8 |
| 2003/0105682 | A1 * | 6/2003 | Dicker | G06Q 30/02 705/26.8 |
| 2006/0282304 | A1 * | 12/2006 | Bedard | G06F 17/30867 705/7.33 |
| 2011/0153663 | A1 * | 6/2011 | Koren | G06F 17/30964 707/776 |
| 2011/0302030 | A1 * | 12/2011 | Lore | G06Q 10/06375 705/14.49 |
| 2014/0019313 | A1 * | 1/2014 | Hu | G06Q 10/087 705/28 |

OTHER PUBLICATIONS

Foley, John, Steve Konicki, and George V. Hulme. "Amazon's IT Agenda." InformationWeek, No. 811, 2000, pp. 56-72.*

* cited by examiner

*Primary Examiner* — Alexis Casey
(74) *Attorney, Agent, or Firm* — Kilpatrick Townsend & Stockton LLP

(57) ABSTRACT

Techniques for providing a recommendation for an item may be provided. In particular, a system can provide a recommendation for one or more items based at least in part on how easily a system can fulfill the recommended item. The ease of fulfillment may be affected by one or more items selected or selected by the user, so that when two potential items can be recommended for the user, the item that is easier to provide to the user with the selected item can receive a better recommendation by the system (e.g., through a ranked or scored recommendation list, by limiting the recommended items provided to a user).

24 Claims, 8 Drawing Sheets

ITEM RECOMMENDATION

BACKGROUND

Advertisements, offers, and recommendations are everywhere in real-world and networked environments. The advertisements may be directed to users to purchase items of a particular brand for a special price or a deal that is only available for a limited time. Unfortunately, most advertisements have little to do with items that a user actually wants. More recent methods of advertising have started to review a user's order history to help advertise a particular item. While these types of advertisements may be relevant to what a user has ordered in the past in hopes that the user will order more of the same item in the future, these types of advertisements may only be directed to selling more items, without taking into account other issues that may affect an item provider's bottom line, user's experience in receiving the item, or other factors.

BRIEF DESCRIPTION OF THE DRAWINGS

Various embodiments in accordance with the present disclosure will be described with reference to the drawings, in which.

DETAILED DESCRIPTION

Figure 1:
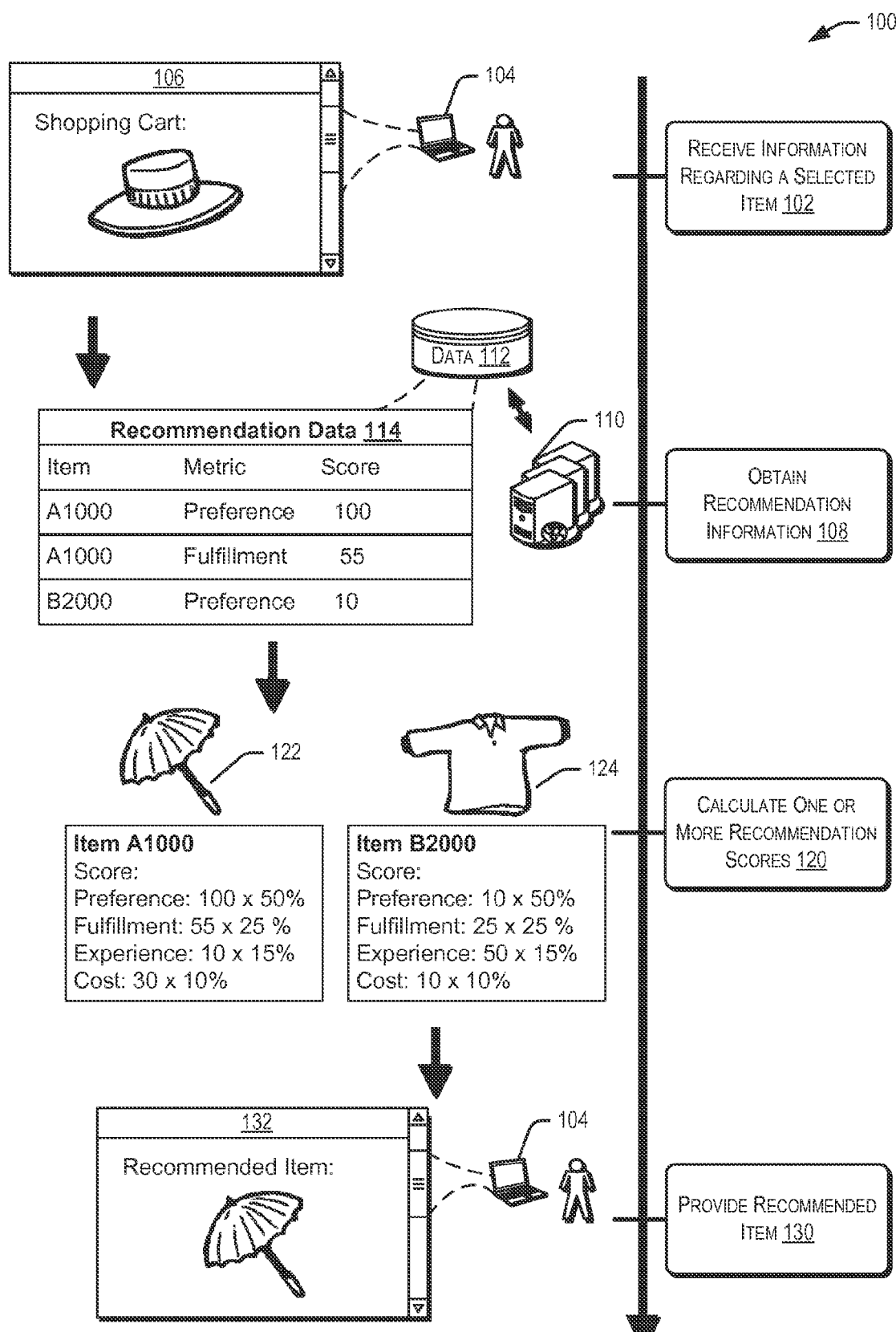
FIG. 1 illustrates an illustrative flow for providing a recommended item based on information described herein, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, a system for providing a recommendation for one or more items based at least in part on how easily a system can fulfill the recommended item. In particular, the ease of fulfillment may be affected by one or more items ordered or selected by the user, so that when two potential items can be recommended for a user who has already selected one item, the item of the two potential items that is easier to provide to the user with the selected item can receive a better recommendation by the system (e.g., through a ranked or scored recommendation list, by limiting the recommended items provided to a user).

In a non-limiting example, the user can add Item 1 to an electronic shopping cart from an electronic catalog or electronic marketplace. The system can identify the location of Item 1 as being stored in a local fulfillment center, and may also identify one or more recommended items for the user. These potential recommended items can include Item 2 and Item 3. The system may associate a ranking or scoring with these items, based at least in part on information associated with Item 1. For example, with Item 1 selected (e.g., in the electronic shopping cart), the system may weigh the potential recommended items relative to the recommended items' distance from Item 1. In this example, Item 2 may only be available in a fulfillment center 3,000 miles from Item 1, which can take an additional two days to arrive to the customer if Item 2 is selected with Item 1. Item 3 may be available in the same local fulfillment center as Item 1. Based at least in part on these factors, the system may provide a higher recommendation for Item 3 to the user.

The selected item may be received via a network page. For example, the selected item may be associated with a request to purchase the selected item, a request to place or add the selected item in an electronic shopping cart, a request to place or add the selected item to a future collection of selected items (e.g., a wish list), a request to receive information about the selected item, or other actions. In an example, the selected item may be associated with a user's intent to purchase the item. The selected item may be provided through an electronic catalog or electronic marketplace, accessible via the network page. In some examples, the network page may be a Web page provided on a Web browser or other application on the user device that can communicate with a system configured to provide the electronic catalog or electronic marketplace.

In some embodiments, selected item information may be obtained in association with the request. The selected item information can be information that describes the selected item. For example, the selected item information can include the name or description of the item, price, one or more locations of where the item is stored, location of where the item plans to be shipped, fulfillment details about the item, users associated with ordering or selecting the item, dimensions or weight of the item, shipping requirements (e.g., hazardous materials, biohazard items, liquid items, temperature limitations, weight limitations), or other relevant information.

Recommended items may be items that are provided to the user as recommendations to purchase, obtain, or receive. The recommended items may be determined based at least in part on a selected item, items selected by other users that also selected the item, and/or on a profile for the user that selected the item. For example, when a user requests to obtain a laptop as a selected item, a recommended item may be a device or accessory associated with the laptop (e.g., recommended item associated with the selected item). In another example, a recommended item may be an item that the user placed in an electronic cart in the past, but did not order.

A recommended item can be determined based in part on collaborative filtering. In some examples, when a selected item is received from a user, a system can find other users that also selected the same item and determine a list of recommended items based in part on the items that those other users selected (e.g., users who bought this item also bought this other item). The system can generate a list of recommended items based in part on the items that the other users selected. The list may be shortened or limited to some pre-determined amount (e.g., top 50 items), items may be removed from the list when the user has already selected them (e.g., based on previous purchase history), or other methods for updating a list. In some examples, the list may be provided based in part on information associated with a user's profile. In some examples, the list of items that other user's previously selected may be generated on a reoccurring basis (e.g., daily) by reviewing orders for an item in a marketplace. Items that are selected more frequently than other items may be associated with a pre-determined list and/or saved as a list in a database, so that processing can run more efficiently.

In some examples, the recommended item can be determined based in part on session information. For example, session information can be created based on interactions with an application or network page (e.g., starting when user opens the network page and ending when the user leaves the network page). The session information can include items that the user views, so that the items can be considered in the recommendation process (e.g., users who looked at this item also looked at this other item). For example, the user may view an item during a session, but not select the item. The system can compare the item that the user viewed with other sessions where the same item was viewed, and document any items viewed during a session to create a list of similar items. The similar items that the other users viewed may be associated as potential recommended items for the user. In some examples, the most common items and/or the similar items can be stored in a database.

One or more recommended items may be associated with recommended item information. In some embodiments, recommended item information can include information that helps describe the recommended item. For example, recommended item information can include the name or description of the item, price, one or more locations of where the item is stored, location of where the item will be shipped from, fulfillment details about the item, users associated with recommending the item, dimensions or weight of the item, shipping requirements (e.g., hazardous materials, biohazard items, liquid items, temperature limitations, weight limitations), or other relevant information.

Recommendation information may be obtained. In an embodiment, the recommendation information can include selected item information, recommended item information, or other information about items. In some embodiments, the recommendation information can include a list of one or more potential items to provide to the user as recommended items. For example, the recommendation information can determine one or more recommended items that the user may order based on a user's preference, browsing history, ordering history, or item inventory in a fulfillment center. In some embodiments, the recommendation information can comprise a list of recommended items. The list of recommended items may be ranked or scored. The list of recommended items can comprise a first recommended item, first recommended item information, a second recommended item, and second recommended item information. For example, the ranked list of recommended items can rank one or more recommended items in a particular order, so that one recommended item may be associated with a greater or higher recommendation than another recommended item. In yet another example, the ranked list of recommended items may include one, two, three, one hundred, three hundred, or any number of recommended items.

In an embodiment, the system may calculate a recommendation score associated with a recommended item. The recommendation score may be used in part to determine which items should be recommended items associated with a selected item or with a user. The recommendation scores may help rank or score the recommended items, such that the recommended items with the higher rank can be provided first or at a higher recommendation than other recommended items with a lower rank. In an embodiment, the recommendation score may be used to help determine which items are easier or harder to fulfill.

The recommendation score associated with the recommended item may be based in part on a variety of factors. In a non-limiting example, a "100" recommendation score may be better than an "−100" recommendation score. In an embodiment, a better recommendation score may be associated with a recommended item that is, for example, stored in the same fulfillment center as a selected item, closer to or takes less time to fulfill with the selected item in a fulfillment center, and/or based at least in part on a comparison of the distance between the two items (e.g., the distance in feet, miles, or time). The comparison may alternatively include a comparison of the location of the selected item in a fulfillment center to a first recommended item and a comparison of the location of the selected item in a fulfillment center to a second recommended item. In another example, a better recommendation score may be associated with a recommended item when the recommended item is located at a fulfillment center that has excess fulfillment capacity in comparison to the fulfillment center that stores an alternative recommended item. In yet another example, a better recommendation score may be associated with a recommended item that is available in the same fulfillment center as a selected item, whereas potential recommended items may be located at other fulfillment centers or in different areas of the same fulfillment center.

In an embodiment, the recommendation scores may be combined to create a multi-dimensional or weighted combination of recommendation scores. The weighted combination may include combining one or more recommendation scores with a percentage or weight. For example, a first recommendation score may correspond with a preference score that is associated with the user's preference for a brand, a second recommendation score may correspond with a fulfillment score that is associated with the relative ease of fulfilling an item, and a third recommendation score may correspond with a cost score that is associated with a potential cost for an item provider. In another example, one recommendation score can consider the preference score, fulfillment score, and cost score, or any combination of these three scores in one multi-dimensional calculation, and a second recommendation score can consider a different preference score, fulfillment score, and cost score, or any combination of these three scores in another multi-dimensional calculation. Other scores may be considered as well, including an experience score that is associated with one or more reviews from users of the item or the number of times that the item has been returned to the item provider in the past. The weighted combination of the scores may total 100%, where 50% of the total is associated with the preference score, 25% of the total is associated with the fulfillment score, and 25% of the total is associated with the cost score. In an embodiment, the recommendation score with the higher or larger weight in the weighted combination may be more important for the user, item provider, item manufacturer, shipping entity, or other entities. In an embodiment, the recommendation scores may be combined by adding the scores to help the system determine which recommended item to provide (e.g., recommend to the user via the network page). The recommended item with the better recommendation score or weighted combination of scores may be provided to the user.

In some examples, a recommended item can receive a better recommendation based in part on collaborative filtering. For example, a first item can be selected and a list of recommended items can be provided to a user. The list of recommended items may be adjusted based in part on information associated with the fulfillment center that stores each of the recommended items. The recommended items in the list can be adjusted based in part on this information. If the user selects the original selected item and also selects a recommended item from the list of recommended items, a different fulfillment center may be selected and the ranking of the recommended items in the list of recommended items can be adjusted based in part on the information associated with the fulfillment center.

FIG. 1 illustrates an illustrative flow for providing a recommended item based on information described herein, according to at least one example. In a non-limiting example, the method 100 can receive a request for a selected item 102. For example, a user operating a user device 104 may browse to an item (e.g., a hat or any other item of a catalog) and include the item in an electronic shopping cart as network content 106. In an embodiment, the network content can be received via a network page. The network page may be a Web page provided on a Web browser or other application on the user device 104.

The method 100 may obtain recommendation information 108. For example, a system 110 can interact with a data store 112 to obtain recommendation information in a recommendation data table 114. The recommendation information can include one or more recommended items. In an embodiment, the recommended items may be associated with identifiers (e.g., A1000, B2000) or other descriptions of the recommended item.

The recommended item may also be associated with a score, which can be used in part to compare recommendation items. For example, the comparison of recommended items may include the user's preference for a particular brand or type of item (e.g., preference score), the ease of fulfilling the item (e.g., fulfillment score), the user's experience in obtaining the selected item or recommended item (e.g., experience score), the cost of providing the item (e.g., cost score), or other metrics. In some examples, the one or more recommendation scores may contain a combination of other scores or metrics that are considered when calculating a recommendation score, including the preference score, fulfillment score, experience score, or cost score.

The recommendation score can be a quantitative measurement of the one or more scores and may be used to rank a recommended item against another recommended item (e.g., "100" to "−100"). For example, the recommendation score may consider a preference score. The preference score may include a measurement of an entity's preference for a particular item or brand (e.g., the user only purchase Acme Brand shirts). In some examples, when the preference score is considered when calculating the recommendation score, the recommendation score can be affected by a user's preference for a particular brand or type of item, which may be relatively high or better than other recommendation scores for other potentially recommended items. When the recommendation score is relatively better than another recommendation score, the method 100 may be more likely to provide the item as a recommended item. The user's preference may be determined based at least in part on the user's order history (e.g., the user only orders items from Acme Co.), searching history (e.g., the user only views content associated with Acme Co.), information provided by the user (e.g., the user's profile says "I like Acme Co. brand"), or other factors. In some examples, the preference score may outweigh other scores included in the recommendation score (e.g., if the user only purchases Acme Brand clothing and the user refuses to purchase Beta Brand clothing, it may not matter how quickly a Beta Brand t-shirt can be fulfilled because the user will probably not select it over an Acme Brand t-shirt).

In another example, recommendation score may be affected by a fulfillment score, which may measure the ease or difficulty of fulfilling the item. The fulfillment score may also consider the fulfillment time associated with retrieving a recommended or selected item. The recommendation score associated with the fulfillment score may be based at least in part on the ease or difficulty of fulfilling the recommended item or the ease or difficulty of fulfilling the recommended item with other items (e.g., the selected item). For example, the fulfillment score may consider the time (e.g., fulfillment time) to retrieve the item from a fulfillment center, the time to ship the item from one fulfillment center to a different fulfillment center, the time to unpack the item from a pallet, freezer, crate, box, or other location, the time to get the item to the user, or other factors that may affect the ease or difficulty of fulfilling the item. In another example, the ease of fulfilling the item can be affected in part by the type of item and special fulfillment needs. For example, the fulfillment score may be lower if the recommended item is associated with a biohazard, hazardous material, liquid or temperature shipping limitations, weight restrictions (e.g., a long-bed semi-truck or plane are required to ship the item), or other specialty fulfillment concerns. These fulfillment concerns may also affect the cost score, including costing extra money to ship on a long bed truck, the cost (e.g., time) of finding or hiring an employee with special biohazard training, and other cost concerns.

Another type of metric that can affect the recommendation score may include a quantitative measurement of the user's experience, associated with an experience score. The experience score may include a measurement of the estimated enjoyment (e.g., high ratings, frequent positive reviews, few returned items). For example, the weighted or multi-dimensional portion of the recommendation score associated with the experience score may be lower when the user is scheduled to receive the selected item 5 days after purchasing the item, than a recommendation score associated with the user that should receive the selected item 1 day after purchase. In this example, the experience score may be a quantitative measurement of how quickly the user receives the selected item based on some threshold (e.g., 1 day, 3 days). In another example, the experience score may be better when the user provides positive feedback to the item provider (e.g., a 5-star review). In yet another example, the experience score may be lower when the item is frequently returned by other users or other users frequently call customer service about the item, indicating that the current user who selected the item may be unhappy with the item.

Yet another type of metric may include a cost score. The cost score may be associated with various types of cost, including fulfillment cost, shipping cost, or post-fulfillment cost. For example, the portion of the recommendation score associated with the cost score may be better when the time associated with retrieving the item from a fulfillment center is relatively low (e.g., the fulfillment cost). A fulfillment cost score may be associated with the number of employees paid for the time to retrieve the item from a location (e.g., from shelf or freezer), money spent on electricity or managing machines to retrieve the item, time to put the item in a bin, time to put the item in a box, time/cost to print a label, time to put the box on a truck/plane, or other factors that can affect the cost associated with fulfilling the item. In another example, the cost score may be lower when the shipping cost the recommended item to the user is relatively high (e.g., next day shipping, many hours for a driver or pilot to transport the item to another location). In yet another example, the cost score may be affected by a post-fulfillment cost. A post-fulfillment cost may be affected by the cost to pay employees to answer questions about an item at a customer service center, the cost to manage returned items to a fulfillment center, the cost/time to reimburse the cost of items that are damaged, or other post-fulfillment costs (e.g., associated with time or money). In some examples, the cost may be based in part on some threshold.

In an embodiment, the recommendation information can also include recommended item information, which may include a location of the recommended item. For example, the location of the recommended item may include the location of the recommended item in a particular state or facility (e.g., item is located in Washington, item is located in Fulfillment Center A), the location of the item within a facility (e.g., item is located in row 20 on shelf 15), the location of the item during transit (e.g., item is located 1 hour away from Fulfillment Center A), or other relevant location information.

The method 100 may calculate one or more recommendation scores 120, such that a recommendation score may be calculated for each recommended item. The one or more recommendation scores can be associated with a recommended item, or the multi-dimensional recommendation score may be affected by a fulfillment score, cost score, preference score, or experience score associated with the recommended item. For example, the calculation of the recommendation score may include the quantitative measurement of how easily the recommended item would be to fulfill (e.g., a fulfillment score of "100" to easily fulfill the item, a fulfillment score of "−100" to not easily fulfill the item). In an embodiment, the calculation may be based in part on a comparison of a first recommendation score associated with a first recommended item and a second recommendation score associated with a second recommended item. In an embodiment, the calculation may be based at least in part on a comparison of the location of the selected item in the fulfillment center to the location of the recommended item.

In some examples, the method 100 may calculate one or more recommendation scores 120 based at least in part on a support vector machine (SVM). The SVM processing may provide a recommendation score that is a multi-dimensional recommendation score that can help determine which item to provide as a recommended item. The SVM can review and/or compare the dimensions associated with the recommended item (e.g., preference, fulfillment, cost, experience). The multi-dimensional score can be associated with the recommendation score, which may help determine a ranking of a recommended item over a different recommended item. In some examples, the SVM can help one aspect of the recommended item overshadow other aspects of the recommended item (e.g., preference for a brand outweighs all other factors).

The recommended item may be provided 130. The recommended item may be provided to the user as network content 132. In an embodiment, the network content can be any content received via a network page, which may be a Web page provided on a Web browser or other application on the user device 104.

The recommended item can be provided using various methods. For example, the recommended item with the best or highest recommendation score may be provided to the user as network content. This may include when the recommended item is associated with a better rank or score than another recommended item. In another example, the recommended item may be provided based at least in part on the recommendation score associated with the recommended item in comparison to another recommendation score. In yet another example, the recommended item may be provided based at least in part upon determining that the recommended item is easier to fulfill than another recommended item. In still another example, the recommended item may be provided based at least in part on determining that the recommendation score associated with the recommended item is better than another recommendation score.

Figure 2:
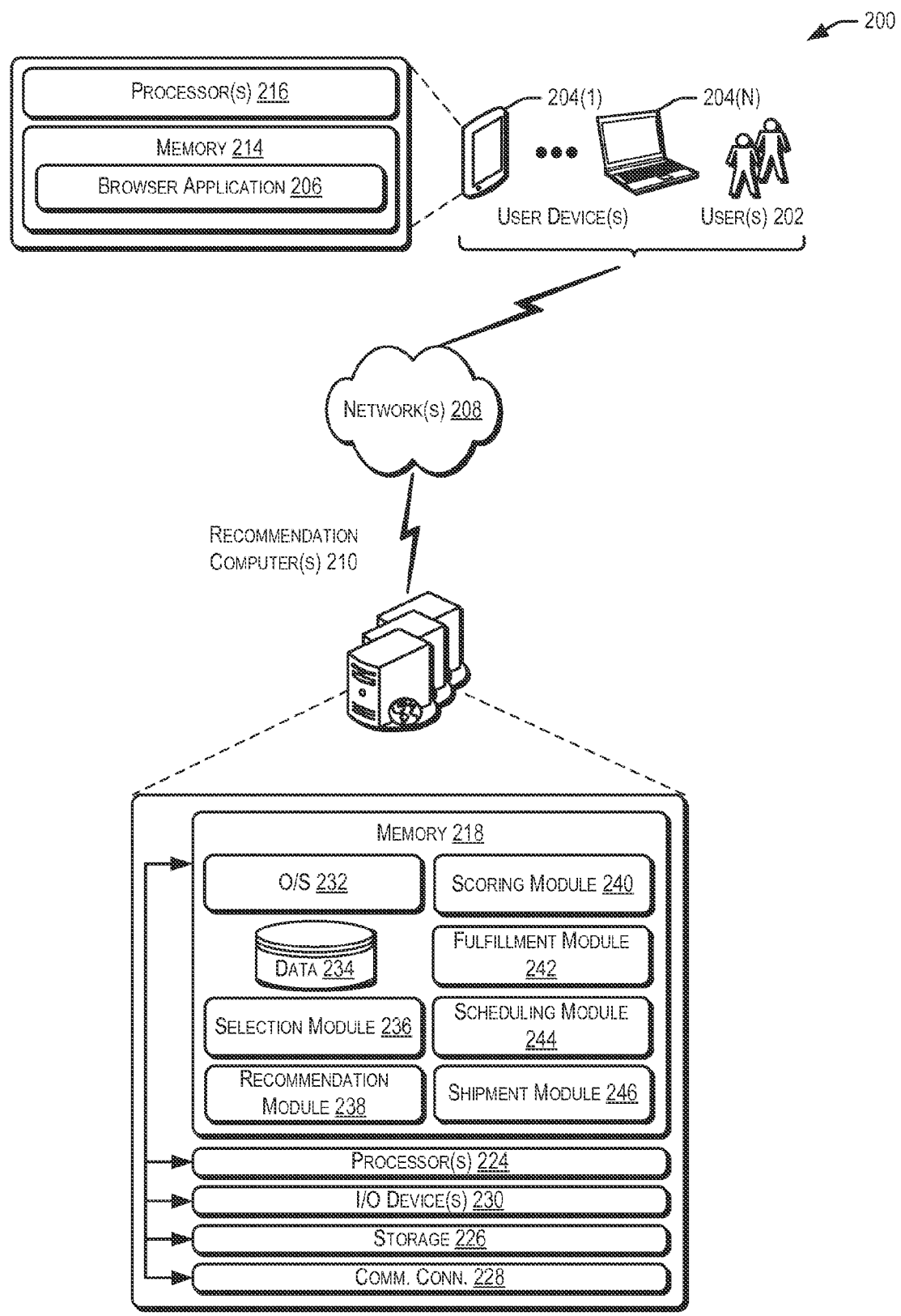
FIG. 2 illustrates an example architecture for providing a recommended item described herein that includes recommendation systems and/or a user device connected via one or more networks, according to at least one example.

FIG. 2 illustrates an example architecture for providing a recommended item described herein that includes recommendation systems and/or a user device connected via one or more networks, according to at least one example. In architecture 200, one or more users 202 (i.e., web browser users) may utilize user computing devices 204(1)-(N) (collectively, user devices 204) to access an application 206 (e.g., a web browser), via one or more networks 208. In some aspects, the application 206 may be hosted, managed, and/or provided by a computing resources service or service provider, such as by utilizing one or more service provider computers and/or one or more recommendation computers 210. The one or more recommendation computers 210 may, in some examples, provide computing resources such as, but not limited to, client entities, low latency data storage, durable data storage, data access, management, virtualization, cloud-based software solutions, electronic content performance management, etc. The one or more recommendation computers 210 may also be operable to provide web hosting, computer application development, and/or implementation platforms, combinations of the foregoing, or the like to the one or more users 202. The one or more recommendation computers 210, in some examples, may provide electronic recommendations for items.

In some examples, the networks 208 may include any one or a combination of many different types of networks, such as cable networks, the Internet, wireless networks, cellular networks and other private and/or public networks. While the illustrated example represents the users 202 accessing the application 206 over the networks 208, the described techniques may equally apply in instances where the users 202 interact with the recommendation computers 210 via the one or more user devices 204 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the application 206 may allow the users 202 to interact with a service provider computer, such as to access web content (e.g., web pages, music, video, etc.). The one or more recommendation computers 210, perhaps arranged in a cluster of servers or as a server farm, may host the application 206 and/or cloud-based software services. Other server architectures may also be used to host the application 206. The application 206 may be capable of handling requests from many users 202 and serving, in response, various item web pages. The application 206 can provide any type of website that supports user interaction, including social networking sites, online retailers, informational sites, blog sites, search engine sites, news and entertainment sites, and so forth. As discussed above, the described techniques can similarly be implemented outside of the application 206, such as with other applications running on the user devices 204.

The user devices 204 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, the user devices 204 may be in communication with the recommendation computers 210 via the networks 208, or via other network connections. Additionally, the user devices 204 may be part of the distributed system managed by, controlled by, or otherwise part of the recommendation computers 210 (e.g., a console device integrated with the recommendation computers 210).

In one illustrative configuration, the user devices 204 may include at least one memory 214 and one or more processing units (or processor(s)) 216. The processor(s) 216 may be implemented as appropriate in hardware, computer-executable instructions, firmware, or combinations thereof. Computer-executable instruction or firmware implementations of the processor(s) 216 may include computer-executable or machine-executable instructions written in any suitable programming language to perform the various functions described. The user devices 204 may also include geo-location devices (e.g., a global positioning system (GPS) device or the like) for providing and/or recording geographic location information associated with the user devices 204.

The memory 214 may store program instructions that are loadable and executable on the processor(s) 216, as well as data generated during the execution of these programs. Depending on the configuration and type of user device 204, the memory 214 may be volatile (such as random access memory (RAM)) and/or non-volatile (such as read-only memory (ROM), flash memory, etc.). The user device 204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 214 may include multiple different types of memory, such as static random access memory (SRAM), dynamic random access memory (DRAM), or ROM.

Turning to the contents of the memory 214 in more detail, the memory 214 may include an operating system and one or more application programs or services for implementing the features disclosed herein including at least the recommended item, such as via the browser application 206 or dedicated applications (e.g., smart phone applications, tablet applications, etc.). The browser application 206 may be configured to receive, store, and/or display a website or other interface for interacting with the recommendation computers 210. Additionally, the memory 214 may store access credentials and/or other user information such as, but not limited to, user IDs, passwords, and/or other user information. In some examples, the user information may include information for authenticating an account access request such as, but not limited to, a device ID, a cookie, an IP address, a location, or the like. In addition, the user information may include a user 202 provided response to a security question or a geographic location obtained by the user device 204.

In some aspects, the recommendation computers 210 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computers are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, the recommendation computers 210 may be in communication with the user devices 204 and/or other service providers via the networks 208, or via other network connections. The recommendation computers 210 may include one or more servers, perhaps arranged in a cluster, as a server farm, or as individual servers not associated with one another. These servers may be configured to implement the content performance management described herein as part of an integrated, distributed computing environment.

In one illustrative configuration, the recommendation computers 210 may include at least one memory 218 and one or more processing units (or processor(s)) 224. The processor(s) 224 may be implemented as appropriate in hardware, computer-executable instructions, firmware, or combinations thereof. Computer-executable instruction or firmware implementations of the processor(s) 224 may include computer-executable or machine-executable instructions written in any suitable programming language to perform the various functions described.

The memory 218 may store program instructions that are loadable and executable on the processor(s) 224, as well as data generated during the execution of these programs. Depending on the configuration and type of recommendation computers 210, the memory 218 may be volatile (such as RAM) and/or non-volatile (such as ROM, flash memory, etc.). The recommendation computers 210 or servers may also include additional storage 226, which may include removable storage and/or non-removable storage. The additional storage 226 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 218 may include multiple different types of memory, such as SRAM, DRAM, or ROM.

The memory 218, the additional storage 226, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 218 and the additional storage 226 are all examples of computer storage media. Additional types of computer storage media that may be present in the recommendation computers 210 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the recommendation computers 210. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The recommendation computers 210 may also contain communications connection(s) 228 that allow the recommendation computers 210 to communicate with a stored database, another computing device or server, user terminals and/or other devices on the networks 208. The recommendation computers 210 may also include I/O device(s) 230, such as a keyboard, a mouse, a pen, a voice input device, a touch input device, a display, speakers, a printer, etc.

Turning to the contents of the memory 218 in more detail, the memory 218 may include an operating system 232, one or more data stores 234, and/or one or more application programs or services for implementing the features disclosed herein including an selection module 236, a recommendation module 238, a scoring module 240, a fulfillment module 242, a scheduling module 244, and/or a shipment module 246. In some examples, the selection module 236 may be configured to receive a request for a selected item. The request may be received as network content from a user or other methods for receiving a request.

The selection module 236 may also be configured to manage a selected item with an electronic catalog or electronic marketplace. For example, the selected item may be an item that has been placed in an electronic shopping cart for purchase by a user. In an embodiment, the selection module 236 may display the selected item in the electronic shopping cart as network content for the user's review before purchase.

The memory 218 may also include a recommendation module 238. The recommendation module 238 may be configured to provide a recommended item to a user. For example, a first recommended item may be provided with a better or higher recommendation than a second recommended item. In an embodiment, the recommended item may be provided as network content.

The recommendation module 238 may also be configured to obtain recommendation information. Recommendation information can include recommended items, a list of items (e.g., selected items, recommended items), or recommended item information. In some embodiments, the recommendation information may include one or more items that a user may select. These items may be become recommended items, such that the recommendation module 238 can determine which of the one or more potential items to provide to the user as recommended items. For example, the recommendation information can include the one or more items that the user may order based on a user's preference, browsing history, ordering history, or item inventory in a fulfillment center.

The recommendation module 238 may also be configured to determine a list of recommended items. The list of recommended items may be ranked or scored. For example, the ranked list of recommended items can include one or more recommended items associated with recommendation scores. A recommended item may be recommended higher than a different recommended item when the recommendation score associated with that recommended item is higher than the recommendation score associated with the other recommended item.

The recommendation module 238 may also be configured to provide or receive recommended item information. For example, the recommended item information may include one or more metrics and/or recommendation scores associated with each recommended item. For example, the recommendation score can include a fulfillment score, a cost score, a preference score, an experience score, or other scores that can affect the overall recommendation of an item in a ranked list of recommended items. In an embodiment, recommended item information includes the location of one or more recommended items in fulfillment centers.

The memory 218 may also include a scoring module 240. The scoring module 240 may be configured to calculate one or more recommendation scores for a recommended item. It should be understood that a recommendation score may be any character, number, symbol, or method of associating with ranking or scoring items, and not necessarily limited to a numerical representation. For example, one recommendation score may be ranked higher than another recommendation score, such that the recommendation scores are better or worse relative to other recommendation scores.

In an embodiment, the scoring module 240 may calculate a recommendation score to determine which items are easier or harder to fulfill. In an embodiment, the scoring module 240 may calculate a recommendation score based in part on a quantitative measurement showing how easily the recommended item would be to fulfill (e.g., a recommendation score of "100" to easily fulfill the item, a recommendation score of "−100" to not easily fulfill the item). In another example, the first recommendation score is better than a second recommendation score when the location of the selected item in the fulfillment center is closer to the location of the first recommended item associated with the first recommendation score.

The recommendation score associated with the recommended item may be based in part on a variety of factors. For example, the recommendation score may include a fulfillment score. The fulfillment score may be related to a difficulty level of preparing the recommended item and the selected item for shipment (e.g., lower difficulty level to ship is associated with a better fulfillment score). In another example, the recommendation score may include a cost score. The cost score may be related to a cost of retrieving the recommended item from a fulfillment center (e.g., lower cost is associated with better recommendation score). In another example, the recommendation score may include a preference score. The preference score may be related to a preference of the user for selecting the recommended item. In yet another example, the recommendation score may include an experience score. The experience score may be related to a number of positive reviews of the recommended item. The experience score may also be related to the number of times a particular item has been returned to an item provider, which may indicate a negative experience with an item.

The scoring module 240 may also be configured to calculate portions of other scores. For example, the scoring module 240 may calculate a recommendation score based at least in part on a fulfillment score, a cost score, a preference score, and/or an experience score. In another example, the scoring module 240 may calculate a cost store based at least in part on a fulfillment cost score, a shipment cost score, and/or a post-fulfillment cost score.

The scoring module 240 may also be configured to calculate a score based at least in part on information received from other modules, including the fulfillment module 242, scheduling module 244, and shipment module 246. In a non-limiting example, a better recommendation score may be associated with a recommended item that is near a selected item in a fulfillment center, based at least in part on a comparison of the distance between the two items. The comparison may alternatively include a comparison of the location of the selected item in a fulfillment center to a first recommended item and a comparison of the location of the selected item in a fulfillment center to a second recommended item. In another example, a better recommendation score may be associated with a recommended item when the recommended item is located at a fulfillment center that has excess fulfillment capacity in comparison to the fulfillment center that stores an alternative recommended item. In yet another example, a better recommendation score may be associated with a recommended item that is available in the same fulfillment center as a selected item.

The scoring module 240 may also be configured to create a multi-dimensional or weighted combination of recommendation scores. The weighted combination may include combining one or more recommendation scores with a percentage or "weight" that the recommendation score will be used in determining which recommended item to provide. For example, a recommendation score may be a multi-dimensional score that considers a preference score, fulfillment score, and cost score. The preference score may correspond with the user's preference for a brand, a fulfillment score may correspond with the relative ease of fulfilling an item, and a cost score may correspond with a potential cost for an item provider. A weighted combination of the recommendation score may total 100%, where 50% of the total is associated with the preference score, 25% of the total is associated with the fulfillment score, and 25% of the total is associated with the cost score. In an embodiment, the recommendation score with the higher or larger score in the weighted combination of scores may be more important for the user, item provider, item manufacturer, shipping entity, or other entities.

The scoring module 240 may also be configured to determine a relative rank or score of the recommended items. For example, a first recommended item may be ranked higher or better than a second recommended item when the first recommended item is easier to fulfill than a second recommended item. In an embodiment, the recommendation scores associated with each recommended item may be used in part to rank the recommended items. For example, when calculating the one or more recommendation scores, the higher recommendation score may be based in part on the user's preference for brands associated with the recommended items from the particular brand. The scoring module 240 may rank the recommended item associated with the preferred brand. In another example, when calculating the one or more recommendation scores, the higher recommendation score may be based in part on the location of the recommended items in one or more fulfillment centers. The scoring module 240 may rank the recommended items based in part on the location of the recommended items in one or more fulfillment centers.

The scoring module 240 may also be configured to rank recommended items based in part on one or more recommendation scores associated with the recommended items. For example, the scoring module 240 may rank the recommended items based on how quickly a user could receive the recommended items once the recommended items are selected. In another example, the scoring module 240 may rank the recommended items based on the relative cost of fulfilling an order of the recommended items.

The scoring module 240 may also be configured to determine which recommended item is easier to fulfill than another recommended item (e.g., fulfillment score). In an embodiment, the item that is easier to fulfill may have the better recommendation score (e.g., "100" is better than "0"). For example, the scoring module 240 may determine that a first recommended item is easier to fulfill with the selected item than a second recommended item is to fulfill with the selected item, because the first recommended item is associated with an "100" preference score while the second recommended item is associated with a "99" recommendation score. Based at least in part on the determination, the first recommended item may be provided.

The scoring module 240 may also be configured to consider feedback. For example, an item provider's poor rating (e.g., less than 5-stars) with users may negatively affect a recommendation score for a recommended item (e.g., the experience score) associated with that item provider. In another example, a recommendation score for a recommended item may be negatively affected when an item provider delays sending a selected item to a user, based on the time between when the user orders the item and when the item provider provides the item for shipment.

The memory 218 may also include a fulfillment module 242. The fulfillment module 242 may be configured to provide, receive, or associate inventory information with one or more items stored with a fulfillment center. The fulfillment module 242 may also be configured to provide, receive, or associate information for fulfilling an item. In an embodiment, information generated by the fulfillment module 242 may be provided to the scoring module 240 to associate with a recommendation score.

The fulfillment module 242 may be configured to provide information to the scoring module 240 in order to assist in generating a recommendation score (e.g., fulfillment or cost score) for a recommended item. For example, the fulfillment module 242 may access a location of a recommended item or a selected item in the fulfillment center. In an embodiment, this may include the estimated time to retrieve a first recommended item and the selected item from one or more locations (e.g., shelves, crates, freezers) in a fulfillment center, compared to the estimated time to retrieve the second recommended item and the selected item from one or more locations (e.g., 1 minute vs. 25 minutes). In an embodiment, this may include the difficulty in accessing the items, which can be based at least in part on the location of the items on a pallet, the use of forklifts to access the items, or other considerations. In an embodiment, this may include the location of the recommended item or the selected item (e.g., on a shelf, in a freezer) in the fulfillment center. In an embodiment, one or more fulfillment centers may store the recommended items, such that the time to transport the recommended items to the location of the selected item can affect the recommendation score for the recommended item.

The fulfillment module 242 may also be configured to determine the difficulty level in preparing the recommended item and selected item for shipment. For example, when a recommended item is located on a high shelf in a fulfillment center that is accessible only by a forklift, and the forklift is normally located on a different side of a fulfillment center from the shelf (e.g., cold shelf, cold storage), the fulfillment module 242 may determine that the recommended item has a high difficulty level in preparing a recommended item for shipment.

The fulfillment module 242 may also be configured to calculate the cost in retrieving an item from a fulfillment center (e.g., cost score). For example, the cost can be associated with the cost of operating a forklift for 10 minutes, the cost of paying an employee's salary to retrieve the item from a fulfillment center shelf, or other costs associated with fulfilling an item.

The fulfillment module 242 may also be configured to determine the capacity of a fulfillment center. For example, a first recommended item may be located at a first fulfillment center and a second recommended item may be located at a second fulfillment center. The amount of items received by and shipped from the fulfillment center may help determine how much excess fulfillment capacity the fulfillment center is associated with, so that when 100 items are shipped from Fulfillment Center A that stores the first recommended item and 200 items are shipped from Fulfillment Center B that stores the second recommended item, Filfillment Center A may be determined to have a higher excess fulfillment capacity than Fulfillment Center B. Based in part on this determination, the fulfillment module 242 may help determine that the item is easier to fulfill, when a first fulfillment center storing the first recommended item has a higher excess fulfillment capacity than a second fulfillment center storing the second recommended item.

The fulfillment module 242 may also be configured to provide information to the recommendation module 238 to help generate selected item information, recommendation information, or recommended item information. For example, the fulfillment module 242 can obtain the location of the recommended item in a fulfillment center and provide the location to the recommendation module as recommended item information. This may affect the recommendation score as well. For example, the recommendation score may be higher when the location of the selected item in the fulfillment center is closer to the location of the recommended item in the fulfillment center.

The memory 218 may also include a scheduling module 244. The scheduling module 244 may be configured to associate a schedule with an item. For example, the schedule of an item may be a shipping schedule for an item. The scheduling module 244 may provide the schedule to help determine the location of the item at a particular time. In an embodiment, information generated by the scheduling module 244 may be provided to the scoring module 240 to associate with a recommendation score.

The scheduling module 244 may also be configured to help determine when a recommended item is easier to fulfill based in part on the shipping schedule for the item. For example, a first shipping schedule for the first recommended item can place a first recommended item at a first location and a second shipping schedule for the second recommended item can place the second recommended item at a second location. When the new location of the first recommended item is closer to the new location of the second recommended item to the selected item, the first recommended item may be easier to fulfill than the second recommended item. In another example, when the new location of the first recommended item would take less time to fulfill with the selected item, the first recommended item may be easier to fulfill than the second recommended item.

The memory 218 may also include a shipment module 246. The shipment module 246 may be configured to determine shipping information for a selected item or recommended item. For example, the shipment module can help calculate the size of a box used to ship a selected item. In another example, the shipment module can help calculate the amount of space remaining in the box chosen to ship the selected item. This information may be used to determine the amount of room remaining in the box to ship the recommended item.

The shipment module 246 may be configured to associate a recommended item with a shipping schedule. This may take into account when the recommended item is scheduled to arrive at a fulfillment center. For example, a first recommended item may be further away from a selected item than a second recommended item, but the shipping schedule (e.g., freight, flights, trucks, arrival time) of the first recommended item will place the first recommended item closer to the selected item by tomorrow. A better recommendation score may be assigned to the first recommended item, based at least in part on the future location of the item relative to the selected item. In still another example, a better recommendation score may be associated with a recommended item based at least in part on the size or dimensions of the recommended item. In this example, the recommended item with a better recommendation score or rank may be the recommended item that fits into a shipping box with the selected item better than another recommended item would fit into a shipping box with the selected item. For example, a better fit may be when the selected item and the first recommended item contains less extra space in a box than the extra space that would result from packing the selected item and the second recommended item in a box.

In an embodiment, information generated by the shipment module 246 may be provided to the scoring module 240 to associate with a recommendation score. For example, the selected item may occupy a 5" by 5" space in a shipment container and the shipment module 246 may calculate that there is 2" by 4" available in a first shipping container and 3" by 6" available in a second shipping container (e.g., leftover space). The shipment module 246 may determine that a first recommended item would completely fill the first shipping container and a second recommended item may completely fill the second shipping container. In a non-limiting example, the shipment module 246 may be configured to determine that a first recommended item is easier to fulfill than a second recommended item, because the cost of shipping the first shipping container is less than the cost of shipping the second shipping container. This may affect the cost score (e.g., shipping cost) in a multi-dimensional or weighted recommendation score. In another non-limiting example, the shipment module 246 may be configured to determine that a first recommended item is easier to fulfill than a second recommended item, because more first shipping containers are available than second shipping containers at a particular fulfillment center.

The shipment module 246 may also be configured to determine whether a recommended item is easier to fulfill than another recommended item based in part on the amount of leftover space available in the shipping box. For example, a first recommended item can be associated with a first size and a second recommended item can be associated with a second size. The selected item may also be associated with a size or a shipping box. The shipping box that may be used to ship the item may be associated with the selected item. In an embodiment, the amount of leftover space available to ship either the first recommended item or the second recommended item may be calculated and/or compared. When the first size is closer to the amount of leftover space than the second size, the shipment module 246 may determine that the first recommended item easier to fulfill than the second recommended item.

The shipment module 246 may also be configured to determine the difficulty level in preparing a recommended item and selected item for shipment. For example, when a recommended item is oddly-shaped and cannot easily fit into a shipment container with other items (e.g., a selected item), the shipment module 246 may determine that the recommended item has a high difficulty level in preparing a recommended item for shipment. This information may be provided to the scoring module 240 to associate with a recommendation score.

The shipment module 246 may also be configured to determine the best way to ship a recommended item with a selected item. For example, the shipment module 246 can determine that the recommended item and the selected item should be shipped to a user in two separate boxes. This may be based in part on the locations of the recommended item and the selected item. In another example, the shipment module 246 can determine that the recommended item or selected item should be transferred (e.g., shipped) to another fulfillment center, in order to ship the recommended item and the selected item in one box to the user. This may be based in part on an entity's recommendation to provide fewer shipments in separate boxes to the user.

The shipment module 246 may also be configured to determine shipping times. For example, the shipment module 246 may determine an average shipping time of a fulfillment center to a particular location, an estimated time that the recommended item and/or selected item should arrive at the location of the user, or other factors.

The shipment module 246 may also be configured to implement a transshipment algorithm and/or bin packing algorithm. It should be understood that other algorithms may be used in one or more embodiments of the disclosure as well.

A few additional examples of the operations of the recommendation computers 210 are also described in greater detail below with reference to FIGS. 3-8.

Figure 3:
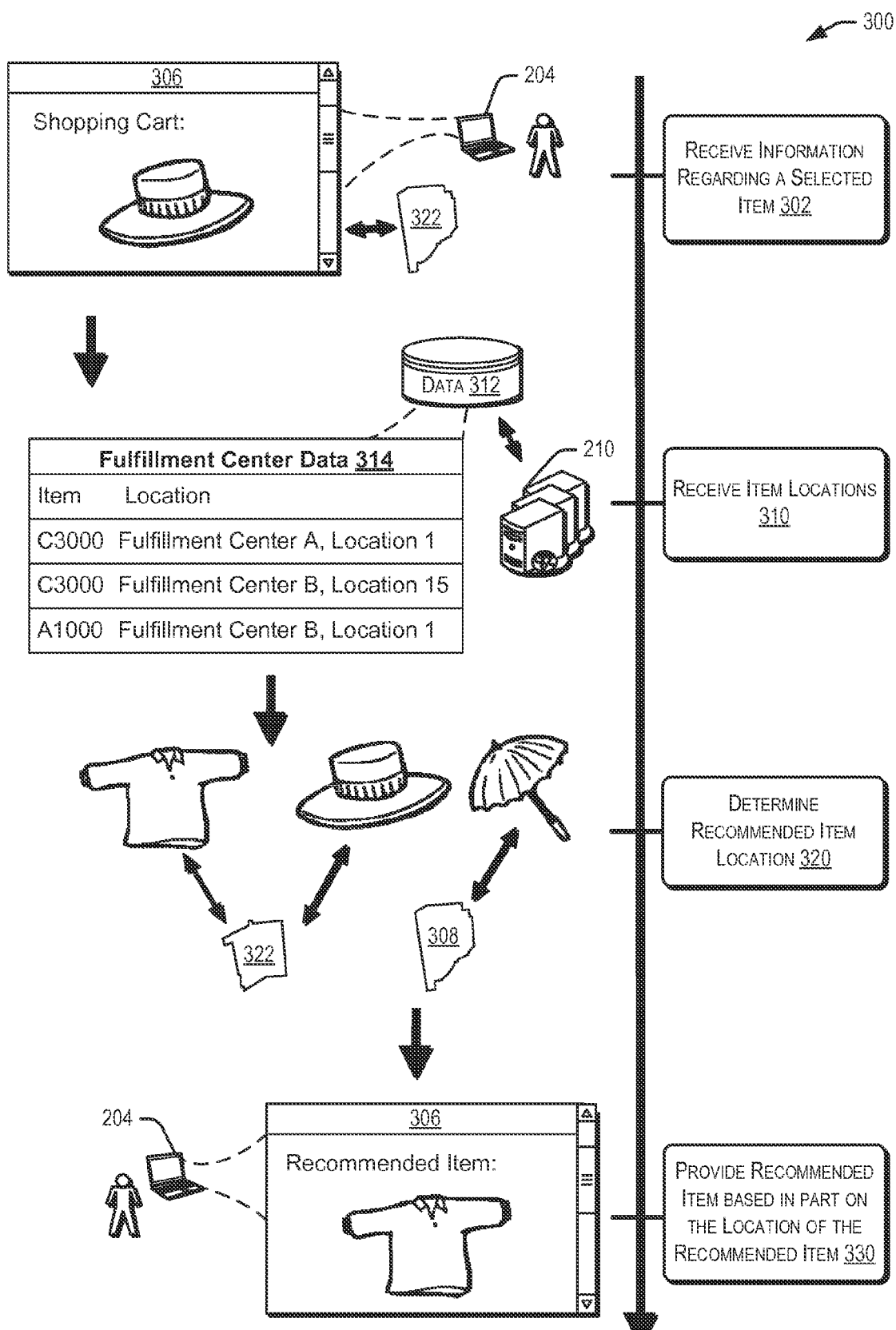
FIG. 3 illustrates an illustrative flow for providing a recommended item based on information described herein, according to at least one example.

FIG. 3 illustrates an illustrative flow for providing a recommended item based on information described herein, according to at least one example. In a non-limiting example, the method 300 may receive information regarding a selected item 302. For example, a user operating a user device 204 may browse to an item (e.g., a hat or any other item of a catalog) and include the item in an electronic shopping cart as network content 306. The item added to the electronic shopping cart may be a selected item. The selected item may be associated with a particular location 308. For example, the location 308 can be a fulfillment center, a city/state geography, or other type of location where an item may be located.

The method 300 may receive item locations 310. For example, the selected item may be associated with an identifier (e.g., C3000) and one or more locations (e.g., Fulfillment Center A, location 1, Fulfillment Center B, location 15), and other items may be associated with an identifier (e.g., A1000) and one or more locations (e.g., Fulfillment Center B, location 1). In an embodiment, the selected item may be located in more than one location. For example, the selected item may not be unique (e.g., similar or identical items that stored in more than one location at the same time) or may be provided to a different location within a time threshold.

The item location can be stored in a data store that includes information about one or more fulfillment centers, including fulfillment center data table 314. For example, a system 210 can interact with a data store 312 to obtain recommendation information in a fulfillment center data table 314. The recommendation information can include one or more recommended items, the locations of the one or more recommended items, or other information.

A recommended item location may be determined 320. In an embodiment, the location of one or more recommended items may be considered in comparison with the selected item. For example, a first recommended item may be located in one location 322 with the selected item and the second recommended item may be located in a second location 308 without the selected item.

The method 300 may provide the recommended item based in part on the location of the recommended item 330. For example, the recommended item and selected item may be located at location 322, which would be easier to fulfill than a recommended item located at a location 308. In some examples, the recommended item may be shipped to the location 322 in order to provide the shipment from one location or may be provided to the user from the first location 308 and shipped to the user in separate shipments.

In another illustrative example, the system may receive a first request to obtain a selected item and a second request to receive a recommended item. The first request and the second request may be received via the network page. Next, the system may receive information associated with the selected item and the recommended item. The information may be one or more locations associated with the selected item or recommended item, such that if more than one of such items exist, the system may receive a list of all potential locations of these items (e.g., stored throughout the world, stored in fulfillment centers). For example, the recommended item may be located in Metro A and Metro B and selected item may be located in Metro B and Metro C. The system may also receive information associated with other recommended items that have not yet been requested via the network page (e.g., a third recommended item). The system may receive information associated with the third recommended item, including a third recommended item location. For example, the third recommended item may be located in Metro C. The system can determine that the third recommended item location (e.g., Metro C) is closer to one of the selected item locations (e.g., also in Metro C) and provide the selected item and the recommended item from that location. In an embodiment, the system may consider a ranked list of recommended items based in part on the location of the recommended items with respect to the selected item.

FIGS. 4-7 illustrate example flow diagrams showing respective processes 500, 600, 700, and 800 for providing a recommended item, according to at least a few examples. These processes are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

Figure 4:
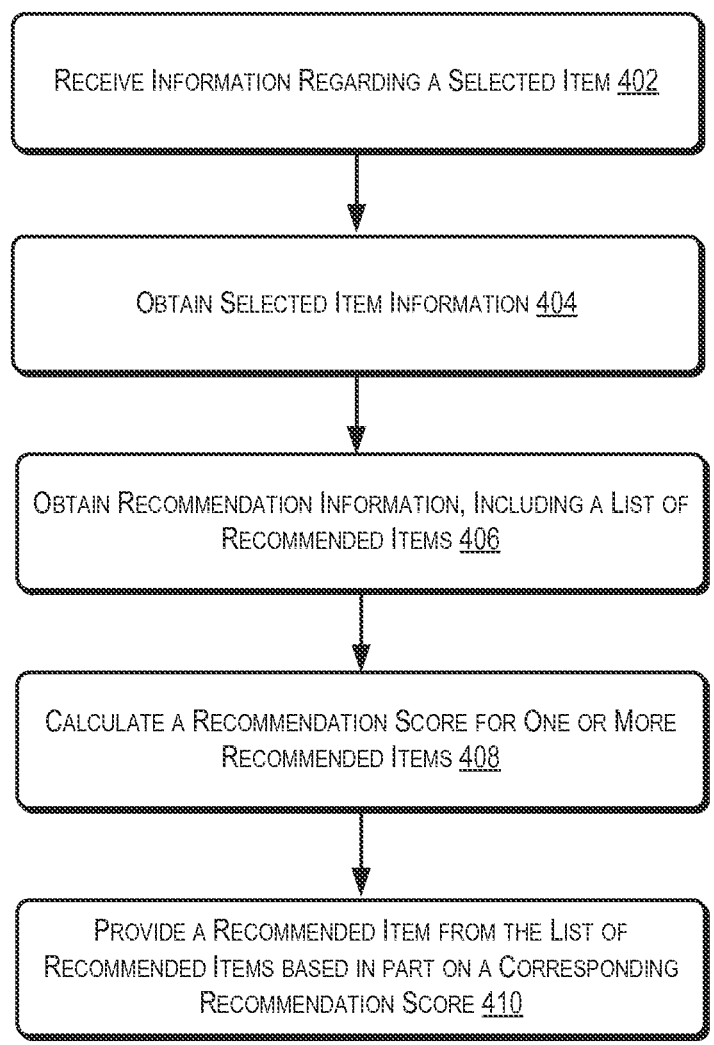
FIG. 4 illustrates an example flow diagram of a process for providing a recommended item described herein, according to at least one example.

FIG. 4 illustrates an example flow diagram of a process for providing a recommended item described herein, according to at least one example. In some examples, the one or more recommendation computers 210 (e.g., utilizing at least one of the selection module 236, the recommendation module 238, the scoring module 240, the fulfillment module 242, the scheduling module 244, and/or the shipment module 246) shown in FIG. 2 may perform the process 400 of FIG. 4. The process 400 may begin at 402 by receiving information regarding a selected item. For example, the request may be received via a network page. At 404, the process 400 may include obtaining selected item information. For example, selected item information can include a location of the selected item in a fulfillment center or a shipping location for the selected item. At 406, the process 400 may include obtaining recommendation information, including a list of recommended items. The list of recommended items may comprise a first recommended item and a second recommended item. In an embodiment, the recommendation information may also comprise first recommended item information and second recommended item information. In an example, the item information can be associated with a location of the recommended item. At 408, the process 400 may include calculating a recommendation score for one or more recommended items. For example, a first recommendation score may be calculated for a first recommended item and a second recommendation score may be calculated for a second recommended item. In an embodiment, the calculation can include a comparison of the location of the selected item in the fulfillment center to a location of the first recommended item. In yet another example, the recommendation score may comprise a fulfillment score, cost score, preference score, experience score, or other scores. Further in some examples, the process 400 may end at 410, where the process 400 may include providing a recommended item from the ranked list of recommended items. The recommended item may be based in part on a corresponding recommendation score for the item. In an embodiment, providing the first recommended item can be based at least in part on the first recommendation score and the second recommendation score.

Figure 5:
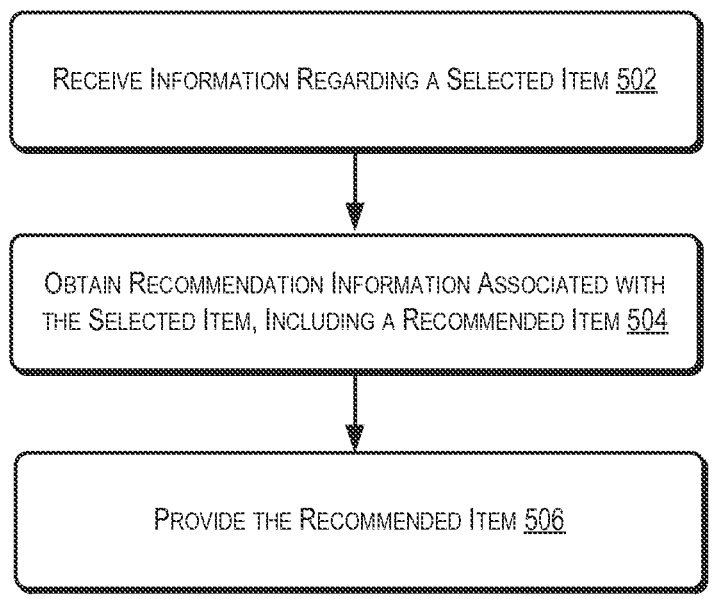
FIG. 5 illustrates an example flow diagram of a process for providing a recommended item described herein, according to at least one example.

FIG. 5 illustrates an example flow diagram of a process for providing a recommended item described herein, according to at least one example. In some examples, the one or more recommendation computers 210 (e.g., utilizing at least one of the selection module 236, the recommendation module 238, the scoring module 240, the fulfillment module 242, the scheduling module 244, and/or the shipment module 246) shown in FIG. 2 may perform the process 500 of FIG. 5. The process 500 may begin at 502 by receiving information regarding a selected item. At 504, the process 500 may include obtaining recommendation information associated with the selected item. In an embodiment, the recommendation information may include a first recommended item and/or a second recommended item. Further in some examples, the process 500 may end at 506, where the process 500 may include providing the first recommended item. In some examples, the first recommended item can be provided to a user device that accesses a network page through an application. In an embodiment, providing the first recommended item can be based at least in part upon determining that the first recommended item is easier to fulfill than the second recommended item. For example, the first recommended item can be easier to fulfill, when a first fulfillment center storing the first recommended item has a higher excess fulfillment capacity than a second fulfillment center storing the second recommended item. In another example, the first recommended item may be easier to fulfill based on a shipping schedule associated with the first recommended item, a faster fulfillment time, an cheaper cost of shipping, or any number of other reasons.

Figure 6:
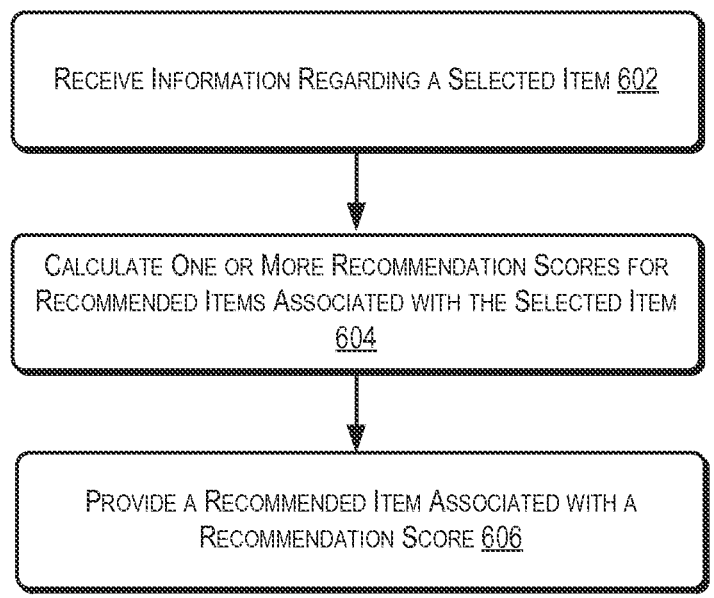
FIG. 6 illustrates an example flow diagram of a process for providing a recommended item described herein, according to at least one example.

FIG. 6 illustrates an example flow diagram of a process for providing a recommended item described herein, according to at least one example. In some examples, the one or more recommendation computers 210 (e.g., utilizing at least one of the selection module 236, the recommendation module 238, the scoring module 240, the fulfillment module 242, the scheduling module 244, and/or the shipment module 246) shown in FIG. 2 may perform the process 600 of FIG. 6. The process 600 may begin at 602 by receiving information regarding a selected item. For example, the recommendation computers 210 may receive a web services call from one or more computers configured to provide the electronic catalog. In this example, the computers configured to provide the electronic catalog may have sent a web page identifying one or more items (or data used by an electronic marketplace app to generate an interface identifying one or more items) to a client computer associated with a user and the user may have selected a displayed item (e.g., the user may have selected an item displayed in a search results page, the user may have selected an item in an item detail page, etc.). Next, the electronic catalog may send a web services call indicting that the user selected the item to the recommendation computers 210. At 604, the process 600 may include calculating one or more recommendation scores for recommended items associated with the selected item. In an embodiment, calculating one or more recommendation scores can include a multi-dimensional or weighted combination of the first recommendation score for the first recommended item and a second recommendation score for a second recommended item. Further in some examples, the process 600 may end at 606, where the process 600 may include providing a first recommended item associated with a first recommendation score. In an embodiment, providing the first recommended item can be based at least in part on determining that the first recommendation score is better than the second recommendation score. For example, the recommendation computers 210 may send a list of items to the client computer for display on the client. The list of items may be sorted such that the first recommended item is prominently displayed by the client computer.

Figure 7:
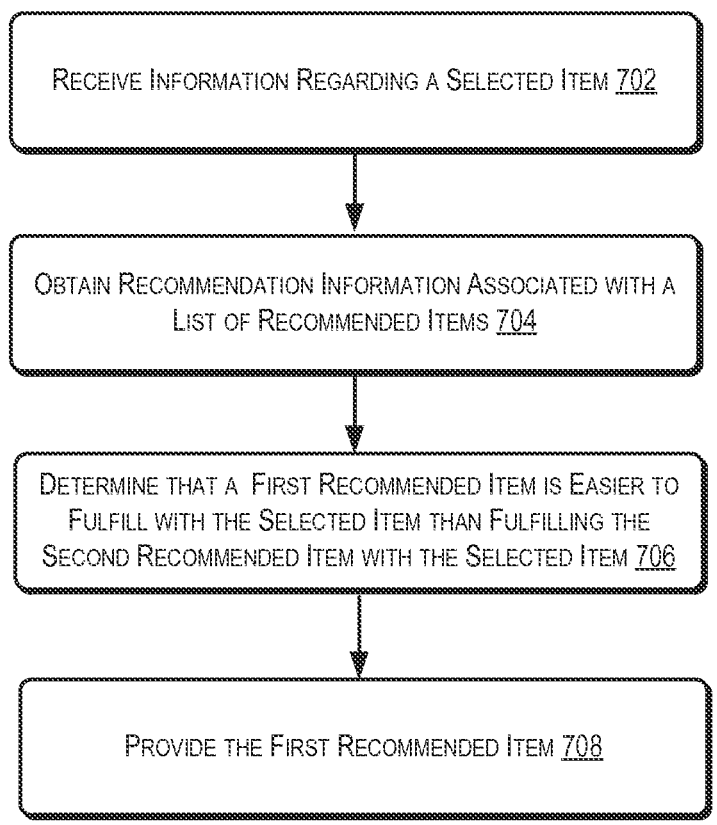
FIG. 7 illustrates an example flow diagram of a process for providing a recommended item described herein, according to at least one example.

FIG. 7 illustrates an example flow diagram of a process for providing a recommended item described herein, according to at least one example. In some examples, the one or more recommendation computers 210 (e.g., utilizing at least one of the selection module 236, the recommendation module 238, the scoring module 240, the fulfillment module 242, the scheduling module 244, and/or the shipment module 246) shown in FIG. 2 may perform the process 700 of FIG. 7. The process 700 may begin at 702 by receiving information regarding a selected item. At 704, the process 700 may include obtaining recommendation information associated with a list of recommended items. In some examples, the list of recommended items may comprise a first recommended item and a second recommended item. In some examples, the list of recommended items may be ranked or scored. At 706, the process 700 may include determining that the first recommended item is easier to fulfill with the selected item than fulfilling the second recommended item with the selected item. Further in some examples, the process 700 may end at 708, where the process 700 may include providing the first recommended item. In an embodiment, providing the first recommended item may be based at least in part on the determination that the first recommended item is easier to fulfill.

Illustrative methods and systems for providing recommended items are described above. Some or all of these systems and methods may, but need not, be implemented at least partially by architectures such as those shown at least in FIGS. 1-7 above.

Figure 8:
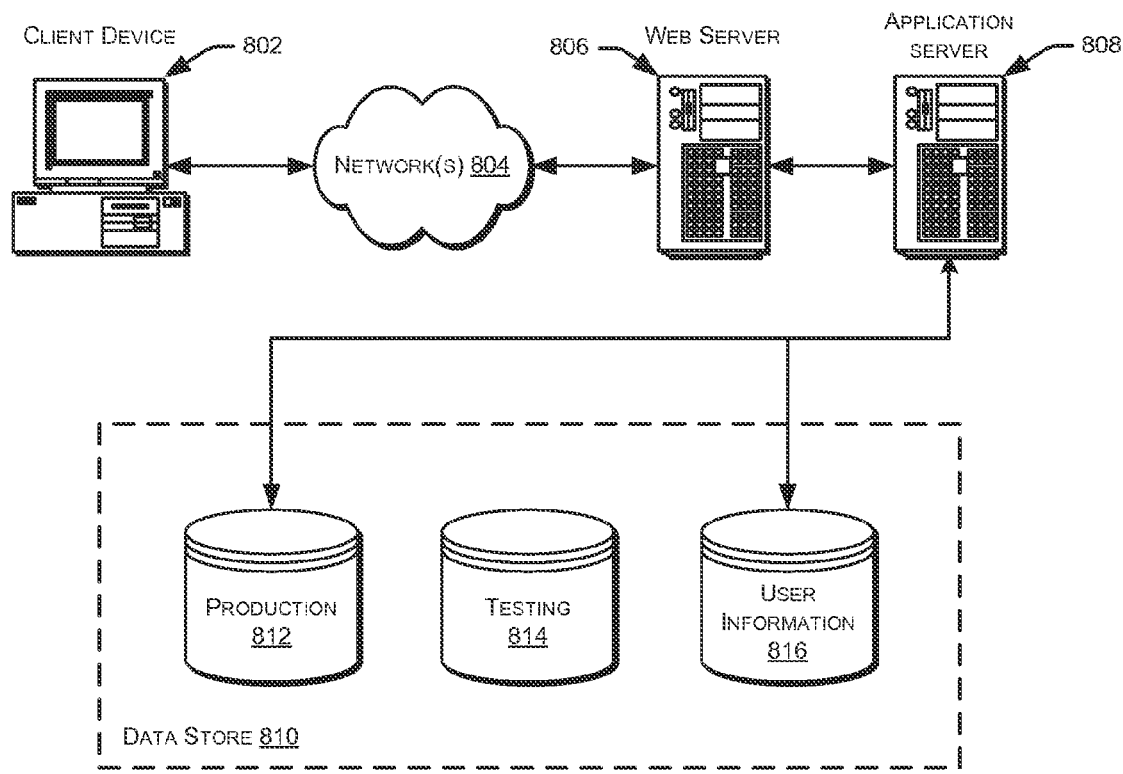
FIG. 8 illustrates an environment in which various embodiments of providing a recommended item described herein can be implemented, according to at least one example.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and/or retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a web page that the user is able to view via a browser on the user device 802. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java® servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules or other data, including RAM, ROM, EEPROM, flash memory or other memory technology, CD-ROM, DVD, or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as that included in the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, and/or at least one of Z in order for each to be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   providing a network page to a user device over a communication network, the network page comprising item information for a physical item;
   receiving a selection via the network page;
   in response to the selection, receiving a current location of the physical item in a home fulfillment center, the current location received from a data store via the communication network;
   obtaining selected item information for the physical item, the selected item information including a shipping location for the physical item;
   obtaining recommendation information for:
     a user associated with the physical item,
     the recommendation information including a list of recommended items, the list of recommended items comprising a first recommended item, first recommended item information, a second recommended item, and second recommended item information,
     the first recommended item information associated with a first location of the first recommended item, the first location being in a first fulfillment center, and
     the second recommended item information associated with a second location of the second recommended item, the second location being in a second fulfillment center that is different than the first fulfillment center;
   calculating a first recommendation score for the first recommended item and a second recommendation score for the second recommended item, the calculation including comparisons of the current location of the physical item in the home fulfillment center to the first location in the first fulfillment center and to the second location in the second fulfillment center, the calculation including a weighted combination of at least:
     a preference score that measures the user's preference for the physical item based at least in part on a user profile that comprises an order history and searching history of other items, and
     a fulfillment score that measures a time to retrieve the physical item from the home fulfillment center or to ship the physical item from the home fulfillment center to at least one of the first fulfillment center or the second fulfillment center,
     wherein the first recommendation score and the second recommendation score are different based at least in part on the corresponding preference score and the fulfillment score for each calculation;
   providing a new network page over the communication network with information about the first recommended item from the list of recommended items based at least in part on the first recommendation score and the second recommendation score;
   receiving a request to order the first recommended item, the request received based at least in part on the information provided over the new network page; and
   initiating a process for shipping the physical item and the first recommended item.

2. The computer-implemented method of claim 1, wherein the first recommendation score includes a first cost score, the first cost score is related to a first cost of retrieving the first recommended item from the first fulfillment center, and wherein the second recommendation score includes a second cost score, the second cost score is related to a second cost of retrieving the second recommended item from the second fulfillment center.

3. The computer-implemented method of claim 2, wherein the first cost score is associated with at least a first fulfillment cost score and the second cost score is associated with at least a second fulfillment cost score.

4. The computer-implemented method of claim 2, wherein the first cost score is associated with at least a first shipment cost score and the second cost score is associated with at least a second shipment cost score.

5. The computer-implemented method of claim 2, wherein the first cost score is associated with at least a first post-fulfillment cost score and the second cost score is associated with at least a second post-fulfillment cost score.

6. The computer-implemented method of claim 1, wherein the first recommendation score includes a first experience score, the first experience score is related to a number of positive reviews of the first recommended item or prior first recommended items returned, and wherein the second recommendation score includes a second experience score, the second experience score is related to a number of positive reviews of the second recommended item or prior second recommended items returned.

7. The computer-implemented method of claim 1, further comprising:
   receiving a first fulfillment capacity for the first fulfillment center;
   receiving a second fulfillment capacity for the second fulfillment center; and
   adjusting the fulfillment score based at least in part on the first fulfillment capacity being greater than the second fulfillment capacity.

8. The computer-implemented method of claim 1, wherein the physical item comprises an item that has been placed in an electronic shopping cart for purchase by the user.

9. A system, comprising:
   a memory that stores computer-executable instructions; and a processor configured to access the memory and execute the computer-executable instructions to collectively at least:

provide a network page to a user device over a communication network, the network page comprising item information for a physical item;

receive a selection the network page;

in response to the selection, receive a current location of the physical item in a home fulfillment center, the current location received from a data store via the communication network;

obtain selected item information for the physical item, the selected item information including a shipping location for the physical item;

obtain recommendation information for:
a user associated with the physical item,
the recommendation information including a list of recommended items, the list of recommended items comprising a first recommended item, first recommended item information, a second recommended item, and second recommended item information,
the first recommended item information associated with a first location of the first recommended item, the first location being in a first fulfillment center, and
the second recommended item information associated with a second location of the second recommended item, the second location being in a second fulfillment center that is different than the first fulfillment center;

calculate a first recommendation score for the first recommended item and a second recommendation score for the second recommended item, the calculation including comparisons of the current location of the physical item in the home fulfillment center to the first location in the first fulfillment center and to the second location in the second fulfillment center, the calculation including a weighted combination of at least:
a preference score that measures the user's preference for the physical item based at least in part on a user profile that comprises an order history and searching history of other items, and
a fulfillment score that measures a time to retrieve the physical item from the home fulfillment center or to ship the physical item from the home fulfillment center to at least one of the first fulfillment center or the second fulfillment center,
wherein the first recommendation score and the second recommendation score are different based at least in part on the corresponding preference score and the fulfillment score for each calculation;

provide a new network page over the communication network with information about the first recommended item from the list of recommended items based at least in part on the first recommendation score and the second recommendation score;

receive a request to order the first recommended item, the request received based at least in part on the information provided over the new network page; and initiate a process for shipping the physical item and the first recommended item.

10. One or more computer-readable storage media storing computer-executable instructions that, when executed by one or more computer systems, configure the one or more computer systems to perform operations comprising:

providing a network page to a user device over a communication network, the network page comprising item information for a physical item;

receiving a selection the network page;

in response to the selection, receiving a current location of the physical item in a home fulfillment center, the current location received from a data store via the communication network;

obtaining selected item information for the physical item, the selected item information including a shipping location for the physical item;

obtaining recommendation information for:
a user associated with the physical item,
the recommendation information including a list of recommended items, the list of recommended items comprising a first recommended item, first recommended item information, a second recommended item, and second recommended item information,
the first recommended item information associated with a first location of the first recommended item, the first location being in a first fulfillment center, and
the second recommended item information associated with a second location of the second recommended item, the second location being in a second fulfillment center that is different than the first fulfillment center;

calculating a first recommendation score for the first recommended item and a second recommendation score for the second recommended item, the calculation including comparisons of the current location of the physical item in the home fulfillment center to the first location in the first fulfillment center and to the second location in the second fulfillment center, the calculation including a weighted combination of at least:
a preference score that measures the user's preference for the physical item based at least in part on a user profile that comprises an order history and searching history of other items, and
a fulfillment score that measures a time to retrieve the physical item from the home fulfillment center or to ship the physical item from the home fulfillment center to at least one of the first fulfillment center or the second fulfillment center,
wherein the first recommendation score and the second recommendation score are different based at least in part on the corresponding preference score and the fulfillment score for each calculation;

providing a new network page over the communication network with information about the first recommended item from the list of recommended items based at least in part on the first recommendation score and the second recommendation score;

receiving a request to order the first recommended item, the request received based at least in part on the information provided over the new network page; and initiating a process for shipping the physical item and the first recommended item.

11. The system of claim 9, wherein the first recommendation score includes a first cost score, the first cost score is related to a first cost of retrieving the first recommended item from the first fulfillment center, and wherein the second recommendation score includes a second cost score, the second cost score is related to a second cost of retrieving the second recommended item from the second fulfillment center.

12. The system of claim 11, wherein the first cost score is associated with at least a first fulfillment cost score and the second cost score is associated with at least a second fulfillment cost score.

13. The system of claim 11, wherein the first cost score is associated with at least a first shipment cost score and the second cost score is associated with at least a second shipment cost score.

14. The system of claim 11, wherein the first cost score is associated with at least a first post-fulfillment cost score and the second cost score is associated with at least a second post-fulfillment cost score.

15. The system of claim 9, wherein the first recommendation score includes a first experience score, the first experience score is related to a number of positive reviews of the first recommended item or prior first recommended items returned, and wherein the second recommendation score includes a second experience score, the second experience score is related to a number of positive reviews of the second recommended item or prior second recommended items returned.

16. The system of claim 9, wherein the instructions are further configured to:
   receive a first fulfillment capacity for the first fulfillment center;
   receive a second fulfillment capacity for the second fulfillment center; and
   adjust the fulfillment score based at least in part on the first fulfillment capacity being greater than the second fulfillment capacity.

17. The system of claim 9, wherein the physical item comprises an item that has been placed in an electronic shopping cart for purchase by the user.

18. The computer-readable storage media of claim 10, wherein the first recommendation score includes a first cost score, the first cost score is related to a first cost of retrieving the first recommended item from the first fulfillment center, and wherein the second recommendation score includes a second cost score, the second cost score is related to a second cost of retrieving the second recommended item from the second fulfillment center.

19. The computer-readable storage media of claim 18, wherein the first cost score is associated with at least a first fulfillment cost score and the second cost score is associated with at least a second fulfillment cost score.

20. The computer-readable storage media of claim 18, wherein the first cost score is associated with at least a first shipment cost score and the second cost score is associated with at least a second shipment cost score.

21. The computer-readable storage media of claim 18, wherein the first cost score is associated with at least a first post-fulfillment cost score and the second cost score is associated with at least a second post-fulfillment cost score.

22. The computer-readable storage media of claim 10, wherein the first recommendation score includes a first experience score, the first experience score is related to a number of positive reviews of the first recommended item or prior first recommended items returned, and wherein the second recommendation score includes a second experience score, the second experience score is related to a number of positive reviews of the second recommended item or prior second recommended items returned.

23. The computer-readable storage media of claim 10, wherein the operations further comprise:
   receiving a first fulfillment capacity for the first fulfillment center;
   receiving a second fulfillment capacity for the second fulfillment center; and
   adjusting the fulfillment score based at least in part on the first fulfillment capacity being greater than the second fulfillment capacity.

24. The computer-readable storage media of claim 10, wherein the physical item comprises an item that has been placed in an electronic shopping cart for purchase by the user.

\* \* \* \* \*